(12) United States Patent
Qi et al.

(10) Patent No.: US 12,292,622 B2
(45) Date of Patent: May 6, 2025

(54) SPECTACLE LENS AND METHOD FOR MANUFACTURING SAME

(71) Applicant: HOYA LENS THAILAND LTD., Pathumthani (TH)

(72) Inventors: Hua Qi, Tokyo (JP); Takako Ishizaki, Tokyo (JP); Keigo Hasegawa, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 550 days.

(21) Appl. No.: 17/621,985

(22) PCT Filed: Sep. 1, 2020

(86) PCT No.: PCT/JP2020/033024
§ 371 (c)(1),
(2) Date: Dec. 22, 2021

(87) PCT Pub. No.: WO2021/059887
PCT Pub. Date: Apr. 1, 2021

(65) Prior Publication Data
US 2022/0244567 A1    Aug. 4, 2022

(30) Foreign Application Priority Data
Sep. 25, 2019   (JP) .................................. 2019-174134

(51) Int. Cl.
G02C 7/02      (2006.01)
G02B 1/14      (2015.01)
G02C 7/06      (2006.01)

(52) U.S. Cl.
CPC .............. *G02C 7/022* (2013.01); *G02B 1/14* (2015.01); *G02C 7/06* (2013.01); *G02C 2202/16* (2013.01)

(58) Field of Classification Search
None
See application file for complete search history.

(56) References Cited

U.S. PATENT DOCUMENTS

2015/0158259 A1    6/2015   Yamamoto et al.
2017/0131567 A1    5/2017   To et al.
(Continued)

FOREIGN PATENT DOCUMENTS

EP    3640714 A1    4/2020
EP    4235276 A2    8/2023
(Continued)

OTHER PUBLICATIONS

PCT/JP2020/033024, "International Preliminary Report on Patentability", Apr. 7, 2022, 6 pages.
(Continued)

*Primary Examiner* — Darryl J Collins
(74) *Attorney, Agent, or Firm* — Oliff PLC

(57) ABSTRACT

Provided are a spectacle lens and a technique associated therewith, the spectacle lens including: an object-side surface and an eyeball-side surface; a first refractive region having a first refractive power based on a prescription for correcting a refractive error of an eye; and a second refractive region having a refractive power different from the first refractive power, the second refractive region having a function of forming a focal point at a position other than a retina of the eye so as to suppress progression of the refractive error of the eye, wherein an interface portion is disposed inside the spectacle lens, the interface portion includes a base portion, and convex portions protruding from the base portion, or concave portions recessed from the base portion, the function of the second refractive region is exerted by using mutually different respective refractive indexes of two types of members sandwiching the interface portion therebetween, and the convex portions or the con-
(Continued)

cave portions, and an outermost surface portion of the spectacle lens that corresponds to the convex portions or the concave portions is smooth.

12 Claims, 4 Drawing Sheets

(56) References Cited

U.S. PATENT DOCUMENTS

| | | |
|---|---|---|
| 2019/0235279 A1 | 8/2019 | Hones et al. |
| 2019/0293840 A1 | 9/2019 | Takeshita |
| 2020/0073147 A1 | 3/2020 | Bakaraju et al. |
| 2020/0284950 A1 | 9/2020 | Shibamoto et al. |
| 2020/0326559 A1 | 10/2020 | Hoshi |
| 2021/0354410 A1* | 11/2021 | Guillot .................. G02C 7/022 |
| 2022/0206318 A1 | 6/2022 | Hoshi |

FOREIGN PATENT DOCUMENTS

| | | |
|---|---|---|
| JP | 2019053103 A | 4/2019 |
| WO | 2018076057 A1 | 5/2018 |
| WO | 2018124204 A1 | 7/2018 |
| WO | 2019124352 A1 | 6/2019 |
| WO | 2020078691 A1 | 4/2020 |

OTHER PUBLICATIONS

PCT/JP2020/033024, "English Translation of International Search Report", Nov. 24, 2020, 2 pages.
EP20867572.8, "Extended European Search Report", Sep. 19, 2023, 9 pages.

* cited by examiner

SPECTACLE LENS AND METHOD FOR MANUFACTURING SAME

CROSS-REFERENCE TO RELATED APPLICATIONS

This application is the National Stage of International Application No. PCT/JP2020/033024, filed Sep. 1, 2020, which claims priority to Japanese Patent Application No. 2019-174134, filed Sep. 25, 2019, and the contents of which is hereby incorporated by reference.

TECHNICAL FIELD

The present disclosure relates to a spectacle lens and a method for manufacturing the same, and particularly relates to a myopia progression suppression lens and a method for manufacturing the same.

BACKGROUND ART

Patent Document 1 describes a spectacle lens that suppresses the progression of refractive errors such as myopia. Specifically, minute convex portions (corresponding to convex portions on a substrate in the present specification) having a spherical shape with a diameter of about 1 mm, for example, are formed on a convex surface, which is an object-side surface of the spectacle lens. Normally, with a spectacle lens, light beams that have entered from the object-side surface are emitted from the eyeball-side surface, and are focused on the retina of the wearer. On the other hand, light beams that have passed through the above-described minute convex portions are focused at a position located toward the object side (the front side) relative to the retina of the wearer. As a result, the progression of myopia is suppressed.

CITATION LIST

Patent Documents

Patent Document 1: US 2017/0131567 A1

SUMMARY OF DISCLOSURE

Technical Problem

When a hard coating layer is formed on the surface having minute convex portions described in Patent Document 1 in order to increase, for example, the scratch resistance, and an antireflection layer is formed on the hard coating layer, both a shape corresponding to the minute convex portions and a shape corresponding to a base portion gradually change on the outermost surface of the spectacle lens, thus making the boundary between the base portion and the minute convex portions unclear. In this case, the inherent defocus power of the minute convex portions may not be exerted.

The term "defocus power" is a refractive power imparted by the shape and/or material of defocus regions, and refers to the difference between the average of defocus values at focal positions X corresponding to the defocus regions, and a focus value at a focal position Y at which light beams that have passed through portions other than the defocus regions converge, the focal position Y being located on the back side relative to a plurality of focal positions X. To put it differently, the term "defocus power" is a difference obtained by subtracting the refractive power of the base portion from the average of the minimum refractive power and the maximum refractive power at a predetermined location of the defocus regions.

It is an aspect of an embodiment of the present disclosure to achieve a defocus power even when a predetermined member is disposed on convex portions or concave portions.

Solution to Problem

The present inventors conducted extensive studies in order to solve the above-described problem. As a result, the present inventors arrived at a method by which the outermost surface of a spectacle lens is smoothed, and instead, an interface portion is provided inside the spectacle lens, with convex portions or concave portions being provided on the interface portion. The inventors also arrived at a method by which, at that time, a defocus power is imparted by using the convex or concave shape of the interface portion, and the difference between the refractive indexes of two types of surface substrates sandwiching the interface portion therebetween.

The present disclosure has been conceived based on the above-described findings.

A first aspect of the present disclosure is a spectacle lens including:
an object-side surface and an eyeball-side surface;
a first refractive region having a first refractive power based on a prescription for correcting a refractive error of an eye; and
a second refractive region having a refractive power different from the first refractive power, the second refractive region having a function of forming a focal point at a position other than a retina of the eye so as to suppress progression of the refractive error of the eye,
wherein an interface portion is disposed inside the spectacle lens,
the interface portion includes a base portion, and convex portions protruding from the base portion, or concave portions recessed from the base portion,
the function of the second refractive region is exerted by using mutually different respective refractive indexes of two types of members sandwiching the interface portion therebetween, and the convex portions or the concave portions, and
an outermost surface portion of the spectacle lens that corresponds to the convex portions or the concave portions is smooth.

A second aspect of the present disclosure is an aspect according to the first aspect,
wherein the two types of members sandwiching the interface portion therebetween are a defocus surface substrate on which the convex portions or the concave portions are provided, and a covering member provided on the defocus surface substrate.

A third aspect of the present disclosure is an aspect according to the first or second aspect,
wherein the interface portion is formed by a defocus surface substrate on which the convex portions or the concave portions are provided, and a hard coating layer provided on the defocus surface substrate.

A fourth aspect of the present disclosure is an aspect according to the third aspect,
wherein the hard coating layer includes a segment smoothing layer that covers the convex portions or the concave portions provided on the defocus surface substrate, and that planarizes the convex portions by filling concave portions between the convex portions if the convex portions are provided, or planarizes the concave portions by filling the concave portions themselves if the concave portions are provided, and a scratch resistant layer that covers the segment smoothing layer.

A fifth aspect of the present disclosure is an aspect according to the third or fourth aspect, wherein the convex portions are provided on the defocus surface substrate, and a refractive index of the defocus surface substrate is larger than a refractive index of the hard coating layer, or the concave portions are provided on the defocus surface substrate, and a refractive index of the defocus surface substrate is smaller than a refractive index of the hard coating layer.

A sixth aspect of the present disclosure is an aspect according to the first or second aspect, wherein the interface portion is formed by a defocus surface substrate on which the convex portions or the concave portions are provided, and lens substrates provided so as to sandwich the defocus surface substrate therebetween.

A seventh aspect of the present disclosure is an aspect according to the sixth aspect, wherein the convex portions are provided on the defocus surface substrate, and a refractive index of the defocus surface substrate is larger than a refractive index of the lens substrates, or the concave portions are provided on the defocus surface substrate, and a refractive index of the defocus surface substrate is smaller than a refractive index of the lens substrates.

An eighth aspect of the present disclosure is an aspect according to any one of the first to seventh aspects, wherein a protruding height of the convex portions or a recessed depth of the concave portions is 4 µm or more.

A ninth aspect of the present disclosure is a method for manufacturing a spectacle lens including:

an object-side surface and an eyeball-side surface;

a first refractive region having a first refractive power based on a prescription for correcting a refractive error of an eye; and a second refractive region having a refractive power different from the first refractive power, the second refractive region having a function of forming a focal point at a position other than a retina of the eye so as to suppress progression of the refractive error of the eye, the method including:

placing an interface portion inside the spectacle lens, the interface portion including a base portion, and convex portions protruding from the base portion or concave portions recessed from the base portion;

causing the function of the second refractive region to be exerted by using mutually different respective refractive indexes of two types of members sandwiching the interface portion therebetween, and the convex portions or the concave portions; and smoothing an outermost surface portion of the spectacle lens that corresponds to the convex portions or the concave portions.

A tenth aspect of the present disclosure is an aspect according to the ninth aspect, including:

a segment smoothing step of applying a segment-smoothing chemical solution to the convex portions or the concave portions provided on a defocus surface substrate on which the convex portions or the concave portions are provided, curing the segment-smoothing chemical solution, and planarizing the convex portions by filling concave portions between the convex portions if the convex portions are provided, or planarizing the concave portions by filling the concave portions themselves if the concave portions are provided, thereby forming a segment smoothing layer; and a scratch resistant layer forming step of applying a scratch-resistant-layer chemical solution different from the segment-smoothing chemical solution to the segment smoothing layer, and curing the scratch-resistant-layer chemical solution, thereby forming a scratch resistant layer on the segment smoothing layer.

An eleventh aspect of the present disclosure is an aspect according to the ninth aspect, including the steps of;

bonding at least a part of a peripheral edge portion of a first lens-substrate mold on which an object-side surface or an eyeball-side surface is formed, to at least a part of a peripheral edge portion of a defocus surface substrate on which the convex portions or the concave portions are provided;

placing a second lens-substrate mold on which an eyeball-side surface or an object-side surface is formed, on a side opposite to the first lens-substrate mold, with the defocus surface substrate interposed between the second lens-substrate mold and the first lens-substrate mold; and filling a raw material composition of a lens substrate between the first lens-substrate mold and the defocus surface substrate, and between the defocus surface substrate and the second lens-substrate mold, after bringing a cavity between the first lens-substrate mold and the defocus surface substrate and a cavity between the second lens-substrate mold and the defocus surface substrate into communication, thereby sandwiching the interface portion between the defocus surface substrate on which the convex portions or the concave portions are provided, and a lens substrate provided on the defocus surface substrate.

Other aspects that can be combined with the above-described aspects are listed below.

The term "smooth" as used in the present specification refers to a state in which the unevenness of the outermost surface is 0.5 µm or less. The term "unevenness of the outermost surface" refers to the difference between a maximum value and a minimum value of the deviation distance from the most approximate sphere at 4ϕ. The term "most approximate sphere" is a spherical shape calculated from a measured value (height distribution) of the outermost surface using the least squares method in the 4ϕ range.

From the viewpoint of the average surface power, the term "smooth" may be defined as follows. The term "smooth" refers to the state of a surface whose rate of change in the average surface power (unit: D) at a given position of the surface in a given direction is 0.5 D/mm or less (preferably 0.4 D/mm or less). Note that the average surface power is represented by the following expression:

Average surface power=Average curvature of curved surface (unit: 1/m)*(Refractive index−1.0)

The term "smooth" may also be defined as follows. That is, the term "smooth" may be defined as a state in which the difference between the minimum value and the maximum value of the average surface power is smaller than the difference (the power added by the filled segments) between the minimum value and the maximum value of the transmission power.

All portions of the outermost surface that correspond to locations where the convex portions or the concave portions are densely present are preferably smooth.

Although all portions of the outermost surface that correspond to locations where the convex portions or the concave portions are densely present are smoothed, the entire outermost surface of the spectacle lens that corresponds to the convex portions or the concave portions is preferably smoothed, and the entire outermost surface located opposite to the aforementioned outermost surface is also preferably smoothed.

The interface portion is preferably extended to the outermost edge of the spectacle lens over the entire circumference of the spectacle lens.

In the case of forming convex portions on the main surface of the defocus surface substrate in order to achieve a myopia progression suppression effect, it is preferable to use a combination of a defocus surface substrate having a refractive index of 1.60 and a covering member having a refractive index of 1.50.

In the case of forming convex portions on the main surface of the defocus surface substrate in order to achieve a myopia progression suppression effect, it is preferable to use a combination of a defocus surface substrate having a refractive index of 1.70 and a covering member having a refractive index of 1.50 or 1.60.

In the case of forming convex portions on the main surface of the defocus surface substrate in order to achieve a myopia progression suppression effect, it is preferable to use a combination of a defocus surface substrate having a refractive index of 1.67 and a covering member having a refractive index of 1.60.

In the case of forming concave portions, rather than convex portions, on the main surface of the lens substrate for the purpose of achieving a myopia progression suppression effect, a defocus power can be achieved by reversing the refractive index of the lens substrate and the refractive index of the covering member.

It is preferable that the segment smoothing layer fills concave portions between the convex portions if the convex portions are provided, or fills the concave portions themselves if the concave portions are provided, and also covers the base portion.

A plurality of convex portions or concave portions may be formed on the interface portion toward the object-side surface of the spectacle lens. Conversely, a plurality of convex portions or concave portions may be formed on the interface portion toward the eyeball-side surface of the spectacle lens. A plurality of convex portions or concave portions may be formed on the interface portion toward one of the two surfaces. A plurality of convex portions or concave portions may be formed on the interface portion toward the two surfaces.

An aspect that achieves a hyperopia progression suppression effect is as follows.

Concave portions are provided on the defocus surface substrate, and the refractive index of the defocus surface substrate is larger than the refractive index of the hard coating layer, or, convex portions are provided on the defocus surface substrate, and the refractive index of the defocus surface substrate is smaller than the refractive index of the hard coating layer.

Another aspect that achieves a hyperopia progression suppression effect is as follows.

Concave portions are provided on the defocus surface substrate, and the refractive index of the defocus surface substrate is larger than the refractive index of the lens substrate, or, convex portions are provided on the defocus surface substrate, and the refractive index of the defocus surface substrate is smaller than the refractive index of the lens substrate.

Advantageous Effects of Disclosure

According to an embodiment of the present disclosure, it is possible to achieve a defocus power even when a predetermined member is disposed on convex portions or concave portions.

DESCRIPTION OF EMBODIMENTS

Figure 1:
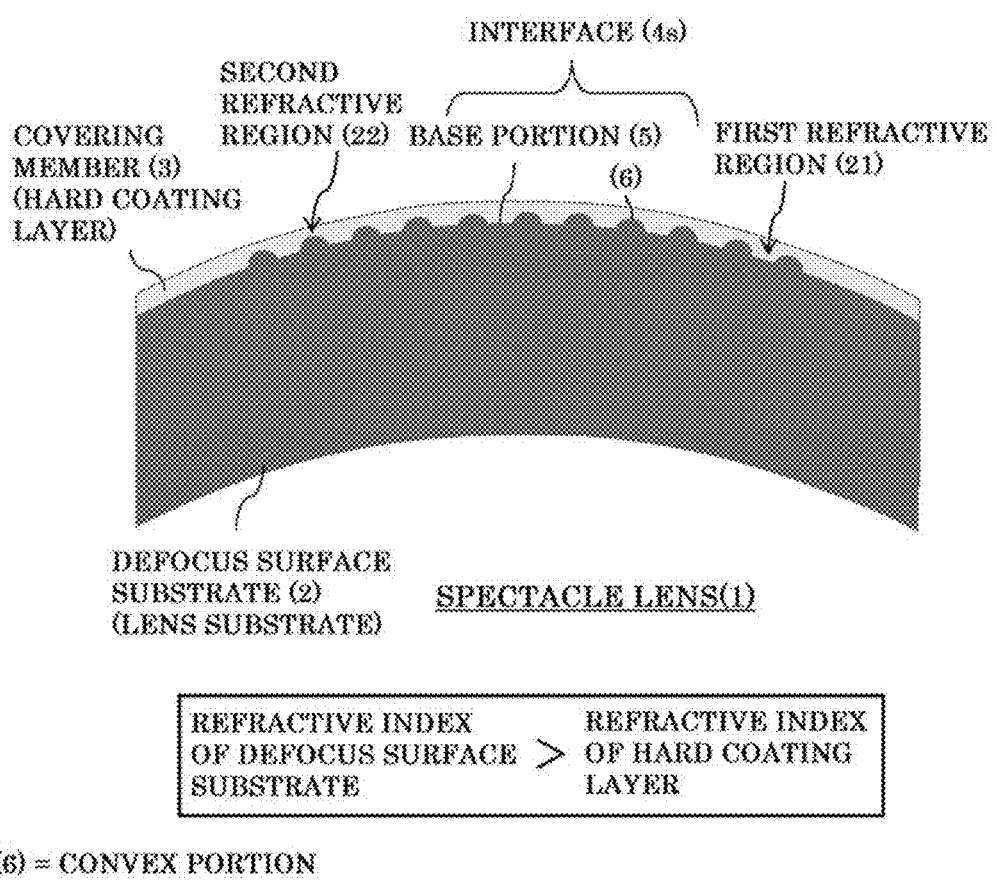
FIG. 1 is a schematic cross-sectional view of a spectacle lens according to Embodiment 1.

Hereinafter, an aspect of the present disclosure will be described. The following description is merely illustrative, and the present disclosure is not limited to the aspects that are described as examples. Reference can be made to Patent Document 1 for details not given below. The components shown in the drawings are provided with reference numerals together with names. The descriptions of the reference numerals are described in the section of the list of the reference numerals in the present specification. For the sake of convenience of description, the reference numerals are omitted in the present specification.

[Spectacle Lens According to Aspect of the Present Disclosure]

A specific configuration of a spectacle lens according to an aspect of the present disclosure is as follows.

"A spectacle lens including:

an object-side surface and an eyeball-side surface;

a first refractive region having a first refractive power based on a prescription for correcting a refractive error of an eye; and a second refractive region having a refractive power different from the first refractive power, the second refractive region having a function of forming a focal point at a position other than a retina of the eye so as to suppress progression of the refractive error of the eye, wherein an interface portion is disposed inside the spectacle lens, the interface portion includes a base portion, and convex portions protruding from the base portion, or concave portions recessed from the base portion, the function of the second refractive region is exerted by using mutually different respective refractive indexes of two types of members sandwiching the interface portion therebetween, and the convex portions or the concave portions, and an outermost surface portion of the spectacle lens that corresponds to the convex portions or the concave portions is smooth."

The spectacle lens according to an aspect of the present disclosure includes an object-side surface and an eyeball-side surface. The term "object-side surface" is a surface located on the object side when a spectacle including the spectacle lens is worn by the wearer. The term "eyeball-side surface" is a surface on the opposite side, or in other words, located on the eye ball side when the spectacle including the spectacle lens is worn by the wearer. In an aspect of the present disclosure, the object-side surface is a convex surface and the eyeball-side surface is a concave surface. That is, the spectacle lens according to an aspect of the present disclosure is a meniscus lens.

The spectacle lens according to an aspect of the present disclosure is a myopia progression suppression lens, as with the spectacle lens described in Patent Document 1. On the other hand, the spectacle lens according to an aspect of the present disclosure is not limited thereto. For example, the spectacle lens according to an aspect of the present disclosure may be a hyperopia progression suppression lens. The details of this will be described in the section of [In the Case of Achieving Hyperopia Progression Suppression Effect]. Note that myopia progression suppression and hyperopia progression suppression may also be collectively referred to as refractive error progression suppression.

The first refractive region corresponds to the first refraction area in Patent Document 1. The phrase "light beams that have entered from the object-side surface" in the above-described specific configuration are assumed to be light beams from infinity. The second refractive region corresponds to the second refraction area in Patent Document 1.

An interface portion is disposed inside the spectacle lens according to an aspect of the present disclosure. This "interface portion" is a portion having a base portion and convex portions or concave portions. The interface portion roughly encompasses the following two cases. In both cases, the interface portion is sandwiched between two types of members.

(Case 1)

Figure 2:
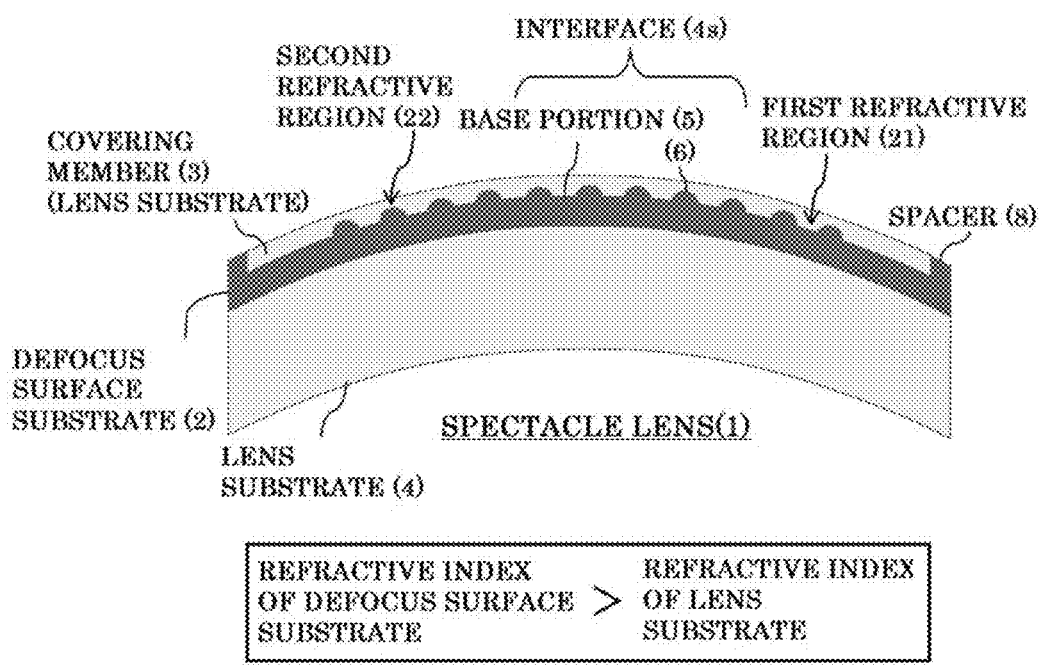
FIG. 2 is a schematic cross-sectional view showing a case where convex portions are provided on a defocus surface substrate of a spectacle lens according to Embodiment 2.
Figure 3:
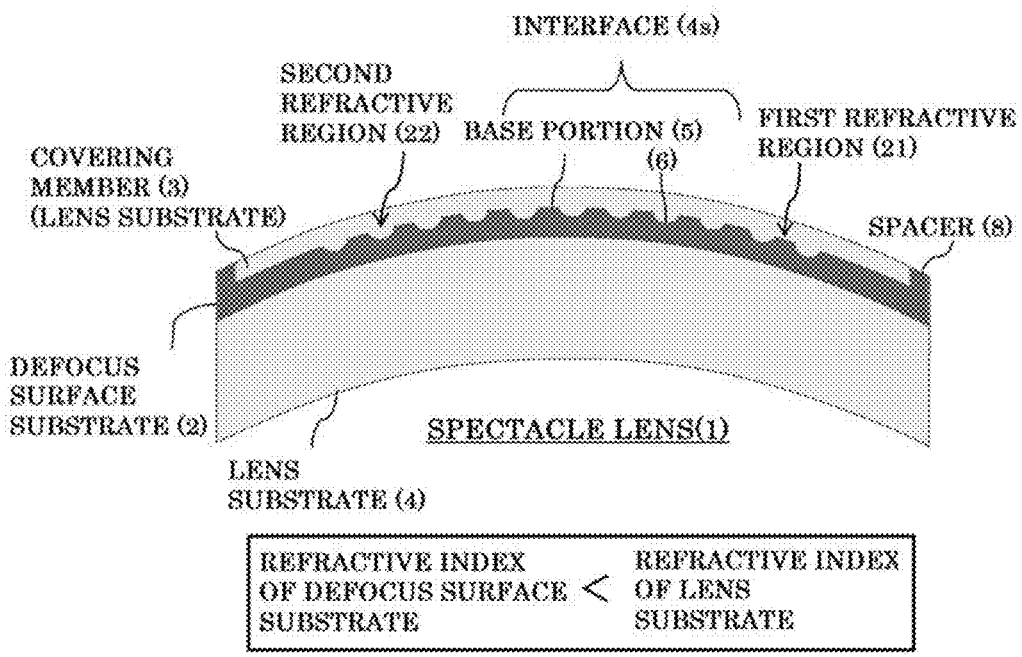
FIG. 3 is a schematic cross-sectional view showing a case where concave portions are provided on the defocus surface substrate of the spectacle lens according to Embodiment 2.

An interface itself that is formed as a result of the defocus surface substrate and the covering member coming into direct contact with each other, as shown in FIGS. 1 to 3 (Embodiments 1 and 2) described below. The interface portion in this case is in the form of a surface.

(Case 2)

Figure 5:
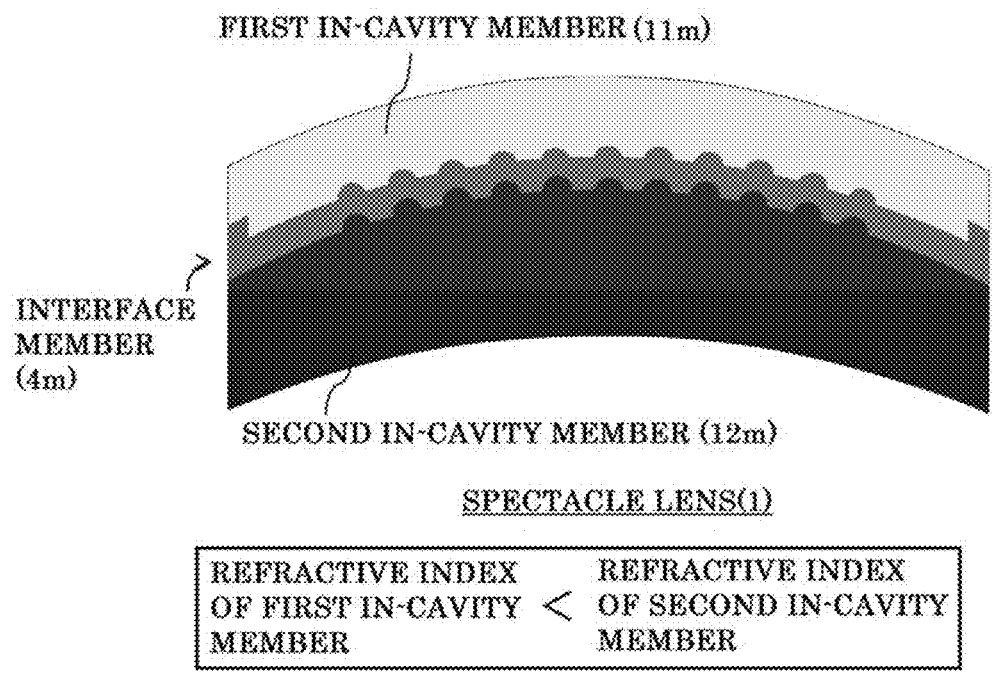
FIG. 5 is a schematic cross-sectional view of a spectacle lens according to Embodiment 3.

A portion including an interface member on which a base portion, and convex portions, for example, are formed on the object-side surface side, and a base portion and concave portions corresponding to the convex portions are formed on the opposite side, as shown in FIG. 5 (Embodiment 3) described below. More specifically, a portion sandwiched between a part of a member disposed on the object-side surface side as viewed from the interface member, the part being in direct contact with the base portion and the convex portions of the interface member, and a part of a member disposed on the eyeball-side surface side as viewed from the interface member, the part being in direct contact with the base portion and the concave portions of the interface member. The interface portion in this case is in the form of a layer.

This interface portion includes a base portion, and convex portions protruding from the base portion or concave portions recessed from the base portion. According to the upper paragraph in (Case 2), the interface member itself includes a base portion, and convex portions protruding from the base portion or concave portions recessed from the base portion.

The term "base portion", as its name indicates, is a portion constituting the base of the shape of the interface portion, and forms one surface if the convex portions or the concave portions are not present.

This interface portion is present between the object-side surface and the eyeball-side surface of the spectacle lens, and at least the base portion and the convex portions or the concave portions are not in contact with the two surfaces.

As shown in FIGS. 2 and 3, when a spacer and a defocus surface substrate that are integrated into one piece is used in manufacturing of the spectacle lens, the spacer may be exposed on the object-side surface (this content is related to Embodiment 2). However, in this case, the base portion and the convex portions or the concave portions are not in contact with the object-side surface. Accordingly, in FIGS. 2 and 3, the interface portion is present between the object-side surface and the eyeball-side surface of the spectacle lens, and at least the base portion and the convex portions or the concave portions are not in contact with the two surfaces, but are embedded in the spectacle lens.

In the first place, when the spectacle lens is shipped after being cut according to the shape of a frame, the outermost edge of the spectacle lens on which the spacer is disposed, shown in FIGS. 2 and 3, is removed. Even when the spectacle lens is shipped without being cut to a frame shape, the outermost edge of the spectacle lens is removed before it is made into a spectacle as a final product. That is, in most cases, the spectacle lens is not provided with the spacer. Ultimately, with or without the definition described in the upper paragraph, the surface portion is, in fact, present between the object-side surface and the eyeball-side surface of the spectacle lens, and at least the base portion and the convex portions or the concave portions are not in contact with the two surfaces.

The convex portions are portions protruding from the base portion. Conversely, the concave portions are portions recessed from the base portion.

In the present specification, the term "protruding distance" from the base portion is a distance, in the normal direction of a surface constituted by the base portion, from the base portion to the vertex of the convex portions of the interface portion. The above-described direction may also be an optical axis direction (lens thickness direction, Z axis; the same applies to the following description). Conversely, the term "recessed depth" from the base portion is a distance from the base portion to the vertex of the concave portions of the interface portion in the above-described direction.

In the spectacle lens according to an aspect of the present disclosure, an outermost surface portion of the spectacle lens that corresponds to the convex portions or the concave portions is smoothed. On the other hand, the function of the second refractive region is exerted by using the mutually different respective refractive indexes of the two types of members sandwiching the interface portion, and the convex portions or the concave portions.

The phrase "outermost surface portion of the spectacle lens that corresponds to the convex portions or the concave portions" refers to a portion that constitutes an outermost surface of the object-side surface or the eyeball-side surface opposed to convex portions or concave portions directly formed on a main surface of a member forming the base portion and the convex portions or the concave portions of the interface portion, the outermost surface portion being located in an optical axis direction from the convex portions or the concave portions.

The term "main surface" is a surface including the base portion and the convex portions or the concave portions on the defocus surface substrate, and is preferably the entire surface on which the convex portions or the concave portions are provided. Another member having a different refractive index is directly coated onto a main surface (a portion including at least a part of the base portion and some of the convex portions or the concave portions) of the defocus surface substrate, whereby an interface portion is formed.

If an antireflection layer is formed on the outermost surface of the spectacle lens, the term "main surface" refers to a portion of the antireflection layer that is located directly above the convex portions or the concave portions. If another layer (e.g., a water-repellent layer made of a fluoride polymer) is formed on the outermost surface, the term "main surface" refers to a portion of the water-repellent layer that is located directly above the convex portions or the concave portions. When a plurality of convex portions are present so as to be spaced apart from and independent of each other as in the case of Patent Document 1, the term "main surface" refers to the entire portion in which the convex portions are densely present. The same applies to the concave portions.

The term "smooth" as used in the present specification refers to a state in which the unevenness of the outermost surface is 0.5 μm or less. The term "unevenness of the outermost surface" refers to the difference between a maximum value and a minimum value of the deviation distance from the most approximate sphere at 4φ. The term "most approximate sphere" is a spherical shape calculated from a measured value (height distribution) of the outermost surface using the least squares method in the 4φ range.

From the viewpoint of the average surface power, the term "smooth" may be defined as follows. The term "smooth" refers to the state of a surface whose rate of change in the average surface power (unit: D) at a given position of the surface in a given direction is 0.5 D/mm or less (preferably 0.4 D/mm or less). Note that the average surface power is represented by the following expression:

Average surface power=Average curvature of curved surface (unit: 1/m)*(Refractive index−1.0)

The term "smooth" may also be defined as follows. That is, the term "smooth" may be defined as a state in which the difference between the minimum value and the maximum value of the average surface power is smaller than the difference (the power added by the filled segments) between the minimum value and the maximum value of the transmission power.

That is, all portions of the outermost surface that correspond to locations where the convex portions or the concave portions are densely present are smooth.

As a result, according to an aspect of the present disclosure, it is possible to achieve a defocus power even when a predetermined member is disposed on convex portions or concave portions.

Children are often subjected to progression suppression for myopia, which is a type of refractive error. According to an aspect of the present disclosure, the interface portion is embedded in the spectacle lens, and there is no risk that a child wearing the spectacle lens will damage the convex portions or the concave portions by accident.

Moreover, according to an aspect of the present disclosure, the function of the second refractive region is exerted by using the refractive indexes of the two types of members sandwiching the interface portion, and the shape of the convex portions or the concave portions. Accordingly, the aspect of the present disclosure is applicable to a wide variety of members. Specifically, to illustrate using Embodiment 1 described below, the range of variations in combinations of the types of the lens substrate serving as the defocus surface substrate and the materials of the hard coating layer covering the main surface of the lens substrate is largely increased. To illustrate using Embodiment 2 described below, the range of variations in combinations of the materials of the film-shaped or plate-shaped defocus surface substrate and the types of the lens substrate covering the main surface of the defocus surface substrate is largely increased.

Although the details will be described in [Details of Spectacle Lens According to Aspect of the Present Disclosure], the types of commercially available lens substrates serving as substrates of spectacle lenses are limited. This means that the types of refractive indexes of lens substrates available are also limited.

Before an aspect of the present disclosure was conceived, a defocus power was exerted by using the refractive index of the lens substrate (i.e., a difference from the refractive index of the atmosphere) and the shape of the convex portions or concave portions provided on the lens substrate. Therefore, the problem as discussed in the section relating to the problem to be solved by the present disclosure arose, and the findings relating to the problem were obtained by the present inventors.

On the other hand, according to an aspect of the present disclosure, the difference between the respective refractive indexes of the two types of members sandwiching the interface portion, rather than the refractive index of the atmosphere, contributes to exertion of a defocus power. Even if a commercially available lens substrate is used as one of the members sandwiching the interface portion, a lens substrate having the desired refractive index may be selected as the other member sandwiching the interface portion. Then, it is sufficient that convex portions or concave portions having a desired shape (e.g., the desired protruding distance or recessed depth) are formed in advance on the interface portion (the main surface of the lens substrate in the present example).

That is, according to an aspect of the present disclosure, a wide variety of commercially available lens substrates can be used, or in other words, the range of refractive indexes can be largely expanded from the viewpoint of product specifications. In particular, this expansion of the range of refractive indexes is more prominent when using the method according to <Embodiment 2> described below.

[Details of Spectacle Lens According to Aspect of the Present Disclosure]

In the following, further specific examples, preferred examples, and modifications of an aspect of the present disclosure will be described.

<Common Features>

The following are specific examples, preferred examples, and modifications that are common to Embodiments 1 and 2 described below.

Although all portions of the outermost surface that correspond to locations where the convex portions or the concave portions are densely present are smoothed, the entire outermost surface of the spectacle lens that corresponds to the convex portions or the concave portions is preferably smoothed, and the entire outermost surface located opposite to the aforementioned outermost surface is also preferably smoothed.

The interface portion is formed by two types of members. On the other hand, for example, at the lens center, a hard coating layer A may be provided on the main surface of the lens substrate serving as the defocus surface substrate, and a hard coating layer B may be provided on an outer peripheral portion of the hard coating layer A. That is, the interface portion need not be formed by only two types of members over the entire lens.

However, this modification leads to complication of processes. Therefore, it is preferable that, as in an aspect of the present disclosure, the interface portion is formed by only two types of members over the entire lens. It is preferable that, as in an aspect of the present disclosure, the interface portion is sandwiched by placing another member on the defocus surface substrate so as to cover the main surface, because the defocus power can be easily adjusted, and the manufacturing will not be made more difficult.

The term "defocus surface substrate" is one of the members sandwiching the interface portion, and the main surface thereof has the shape of the interface portion. In Embodiments 1 and 2, the term "defocus surface substrate" is a member that forms the base portion and the convex portions or the concave portions of the interface portion, and constitutes one element for generating a defocus power. In Embodiment 1, a lens substrate corresponds to the defocus surface substrate. In Embodiment 2, a film-shaped or plate-shaped member embedded in the spectacle lens corresponds to the defocus surface substrate.

The other member described above is also referred to as a covering member. A fluid (liquid) raw material is used as the raw material of the covering member, and the main surface of the defocus surface substrate and the raw material are brought into contact with each other. A member onto which the shape of the convex portions or the concave portions of the defocus surface substrate is transferred by solidifying the raw material is referred to as a covering member. The following description will be given based on the example described in the present paragraph.

The interface portion is preferably extended to the outermost edge of the spectacle lens over the entire circumference of the spectacle lens. In particular, in the case of using the method according to Embodiment 2 described below, it is preferable to adopt this configuration because the manufacturing will not be made more difficult.

Since the range of refractive indexes can be expanded, each of the refractive indexes of the two types of members sandwiching the interface portion is not limited.

Examples of combinations for achieving a myopia progression suppression effect in the case of forming convex portions on the main surface of the defocus surface substrate include a combination of a defocus surface substrate having a refractive index of 1.60 and a covering member having a refractive index of 1.50.

Other examples of a combination for achieving a myopia progression suppression effect in the case of forming convex portions on the main surface of the defocus surface substrate include a combination of a defocus surface substrate having a refractive index of 1.70 and a covering member having a refractive index of 1.50 or 1.60.

In the case of forming convex portions on the main surface of the defocus surface substrate in order to achieve a myopia progression suppression effect, exemplary combinations include a combination of a defocus surface substrate having a refractive index of 1.67 and a covering member having a refractive index of 1.60.

In the case of forming concave portions, rather than convex portions, on the main surface of the defocus surface substrate for the purpose of achieving a myopia progression suppression effect, a defocus power can be achieved by reversing the refractive index of the defocus surface substrate and the refractive index of the covering member.

For the combinations of refractive indexes listed above, the protruding height of the convex portions or the recessed depth of the concave portions is preferably set to be large, because there is no significant difference in refractive index between the defocus surface substrate and the covering member. Specifically, the protruding height of the convex portions or the recessed depth of the concave portions is preferably 4 μm or more.

For details other than those described above, the preferred examples described in Patent Document 1 may be adopted. For example, in the case of achieving a myopia progression suppression effect, the second refractive regions disposed so as to be separated from and independent of each other may have a refractive power larger than the first refractive power of the first refractive region by 2.00 D to 5.00 D.

The second refractive regions may each have a circular shape having a surface area of about 0.50 to 3.14 mm$^2$, and a diameter d of about 0.8 to 2.0 mm. The large number of island-shaped second refractive regions may be substantially uniformly disposed in the vicinity of the lens center so as to be separated from each other at a distance substantially the same as the value of a radius d/2.

The second refractive regions may be formed so as to fall within a circular region centered around an optical center O of the lens and having a radius R (20 mm or less). For example, the second refractive regions may be disposed so as to form a hexagon inscribed in a circle having a radius R. Here, the second refractive regions may not be disposed in a circular region centered around the optical center O of the spectacle lens and having a radius of 2.5 to 10.0 mm. Also, in a region in which the second refractive regions and the first refractive power region are formed in a mixed manner, the ratio of a total area of the second refractive regions to a total area of the second refractive regions and the first refractive region may be 20 to 60%.

In the spectacle lens according to an aspect of the present disclosure, it is preferable that a plurality of convex portions or concave portions regularly arranged in the vicinity of the lens center are provided in the interface portion. Each of the convex portions or the concave portions is preferably formed by a curved surface having a curvature different from that of the object-side surface of the spectacle lens.

As a result of forming such convex portions, it is preferable that substantially circular convex portions or concave portions are disposed on the main surface of the interface portion in the form of islands at equal intervals in the circumferential direction and the axial direction around the lens center in a plan view. To put it differently, it is preferable that substantially circular convex portions or concave portions are disposed in a state in which they are spaced apart without being adjacent to each other, or in other words, in a state in which the base portion of the interface portion is present between the convex portions or the concave portions.

A plurality of convex portions or concave portions may be formed on the interface portion toward the object-side surface of the spectacle lens. Conversely, a plurality of convex portions or concave portions may be formed on the interface portion toward the eyeball-side surface of the spectacle lens. A plurality of convex portions or concave portions may be formed on the interface portion toward one of the two surfaces. A plurality of convex portions or concave portions may be formed on the interface portion toward the two surfaces.

An antireflection layer may be provided directly on the hard coating layer, or via another layer. The antireflection layer may be formed by depositing, for example, an antireflection agent such as $ZrO_2$, $MgF_2$, or $Al_2O_3$ through vacuum deposition. The visibility of an image seen through the spectacle lens can be improved by covering the spectacle lens with such an antireflection layer.

Note that the convex portions or the concave portions may be provided at a location where the optical axis passes through the lens center as shown in FIG. 11 of Patent Document 1, or a region in which the convex portions or the concave portions are not provided may be secured at a location where the optical axis passes through, as shown in FIG. 1 of Patent Document 1.

The defocus surface substrate may be made of a thermosetting resin material such as a thiourethane resin, an allyl resin, an acrylic resin, or an epithio resin. The defocus surface substrate may be a lens substrate made of inorganic glass, rather than a resin material. The same applies to the raw material of the covering member. Ultimately, there is no particular limitation on the raw materials as long as the function of the second refractive region can be exerted by using the refractive index of the defocus surface substrate, the refractive index of the covering member that covers the main surface of the defocus surface substrate, and the shape of the convex portions or the concave portions.

In the following, each of the embodiments will be described separately.

Embodiment 1

FIG. 1 is a schematic cross-sectional view of a spectacle lens according to Embodiment 1.

In Embodiment 1, a case will be described where a hard coating layer is provided on a defocus surface substrate, which is a lens substrate. That is, in Embodiment 1, an interface portion is formed by a defocus surface substrate in the form of a lens substrate on which convex portions or concave portions are provided, and a covering member in the form of a hard coating layer provided on the lens substrate.

When a myopia progression suppression effect is intended to be achieved, and convex portions are provided on the defocus surface substrate, the refractive index of the defocus surface substrate is preferably larger than the refractive index of the hard coating layer. Conversely, when concave portions are provided on the defocus surface substrate, the refractive index of the defocus surface substrate is preferably smaller than the refractive index of the hard coating layer.

The hard coating layer and a hard coat agent serving as the material of the hard coating layer are not particularly limited. Note that the hard coating layer needs to completely cover the convex portions or the concave portions formed on a main surface of the defocus surface substrate (here, the lens substrate). However, this may not be sufficient to smooth the outermost surface of the spectacle lens. The reason being that, even if the convex portions or the concave portions are completely covered, the outermost surface of the covering member may still have a shape resulting from making the convex portions or the concave portions obtuse. Therefore, the hard coating layer needs to be formed to have a thickness sufficient to prevent the convex portions or the concave portions from having an effect on the outermost surface of the spectacle lens. For example, to prevent the influence of convex portions having a protruding distance of 4 μm from appearing on the outermost surface of the spectacle lens, the thickness of the hard coating layer needs to be set to at least 10 μm or more. This is because, when the thickness is about 5 μm, the effect of the convex portions or the concave portions remains on the outermost surface in the case where a conventional hard coating layer with a single layer is used.

On the other hand, a thermosetting resin has been conventionally used as a hard coating layer of a spectacle lens, and it is difficult to ensure a thickness of 10 μm or more with a thermosetting resin. Even if such a thickness can be ensured, there is the possibility that the thermosetting resin will cause cracking, or if not, may cause distortion, and that the distortion will affect the power distribution originally set for the spectacle lens.

Although it is conceivable to use a photocurable resin in place of the thermosetting resin, there is the possibility that cracking or distortion will eventually occur even if a thickness of 10 μm or more is ensured with the photocurable resin.

As a result of intensive studies based on the above-described findings, the present inventors have arrived at the following preferable method.

First, the main surface of the defocus surface substrate is coated with a segment smoothing layer. Specifically, the convex portions or the concave portions are covered, and the convex portions are planarized by filing concave portions between the convex portions if the convex portions are provided, or the concave portions are planarized by filling the concave portions themselves if the concave portions are provided (segment smoothing step). Thereafter, a hard coating layer (scratch resistant layer) inherently having scratch resistance is further coated on the segment smoothing layer (scratch resistant layer forming step). Note that the scratch resistant layer may be formed directly on the segment smoothing layer, or may be formed with another layer interposed between the scratch resistant layer and the segment smoothing layer.

As used in the present specification, a structure including a segment smoothing layer in addition to a hard coating layer is referred to as a hard coating layer. The hard coating layer includes a layer directly covering the main surface of the defocus surface substrate, and includes a layer located immediately below an antireflection layer (if provided).

It is preferable that the segment smoothing layer fills the concave portions between the convex portions if the convex portions are provided, or fills the concave portions themselves if the concave portions are provided, and also covers the base portion.

The segment smoothing layer and the raw material thereof are not particularly limited. For example, the raw material may be an ultraviolet (light) curable resin with a low hardness and high flexibility, or may be a high-concentration thermosetting resin. Also, any raw material conventionally used as a primer layer may be used. Furthermore, any raw material conventionally used as a photochromic film may be used.

With the spectacle lens according to Embodiment 1, it is possible to set the thickness of the hard coating layer to be large, in addition to achieving the effect provided by [Spectacle Lens According to Aspect of the Present Disclosure]. As a result, the scratch resistance is further improved.

Embodiment 2

FIG. 2 is a schematic cross-sectional view showing a case where convex portions are provided on a defocus surface substrate of a spectacle lens according to Embodiment 2.

FIG. 3 is a schematic cross-sectional view showing a case where concave portions are provided on the defocus surface substrate of the spectacle lens according to Embodiment 2.

In Embodiment 2, an interface portion is formed by a defocus surface substrate on which convex portions or concave portions are provided, and lens substrates (corresponding to covering members) provided so as to sandwich the defocus surface substrate therebetween. Specifically, in Embodiment 2, a case will be described where a film-shaped defocus surface substrate, which is to form an interface portion, on which convex portions are formed on a base portion is disposed inside the spectacle lens, using an adhesive tape in place of a gasket.

Note that any known material may be used as the adhesive tape and a matrix including the adhesive tape, and a case will be shown where the adhesive tape (denoted by reference numeral 46 in the publication) and the matrix (denoted by reference numeral 48 in the publication) described in JP 2013-160994 are used. The specific method for manufacturing the spectacle lens is as described in JP 2013-160994, except that the polarized film of JP 2013-160994 is replaced by the defocus surface substrate, and therefore the details are omitted.

When a myopia progression suppression effect is intended to be achieved, and convex portions are provided on the defocus surface substrate, the refractive index of the defocus surface substrate is preferably larger than the refractive index of the lens substrate. Conversely, when concave portions are provided on the defocus surface substrate, the refractive index of the defocus surface substrate is preferably smaller than the refractive index of the lens substrate.

The raw material of the film-shaped defocus surface substrate is not particularly limited as long as the defocus surface substrate has an intended refractive index that is based on the technical idea of the present disclosure. The thickness of the defocus surface substrate is not particularly limited, and the defocus surface substrate may have a plate shape (including, a flat plate shape and a curved plate shape) rather than a film shape. The shape of the base portion of the defocus surface substrate may or may not match the object-side surface or the eyeball-side surface. Ultimately, the shape of the base portion is not particularly limited, as long as the shape contributes to the exertion of a defocus power.

With the spectacle lens according to Embodiment 2, in addition to achieving the effect provided by [Spectacle Lens According to Aspect of the Present Disclosure], it is possible to easily produce a spectacle lens by adopting a film-shape or plate-shaped defocus surface substrate and using the adhesive tape described in JP 2013-160994 in place of a gasket. Also, the refractive index of the film-shaped or plate-shaped defocus surface substrate, the refractive index of a composition injected into a cavity formed by the adhesive tape, and the shape of the convex portions or the concave portions of the defocus surface substrate may be set in advance. By doing so, the range of refractive indexes can be largely expanded, and, moreover, the desired defocus power can be exerted.

[Method for Manufacturing Spectacle Lens According to Aspect of the Present Disclosure]

The technical idea of the present disclosure is also applicable to a method for manufacturing a spectacle lens. The configuration is as follows.

"A method for manufacturing a spectacle lens including:
an object-side surface and an eyeball-side surface;
a first refractive region having a first refractive power based on a prescription for correcting a refractive error of an eye; and
a second refractive region having a refractive power different from the first refractive power, the second refractive region having a function of forming a focal point at a position other than a retina of the eye so as to suppress progression of the refractive error of the eye, the method including:
placing an interface portion inside the spectacle lens,
the interface portion including a base portion, and convex portions protruding from the base portion or concave portions recessed from the base portion;
causing the function of the second refractive region to be exerted by using mutually different respective refractive indexes of two types of members sandwiching the interface portion therebetween, and the convex portions or the concave portions; and
smoothing an outermost surface portion of the spectacle lens that corresponds to the convex portions or the concave portions."

A preferred example that is applicable to the method for manufacturing of a spectacle lens according to an aspect of the present disclosure is the same as the spectacle lens described above.

In Embodiment 1, it is preferable that the interface portion is formed by a hard coating layer obtained by applying a chemical solution to the defocus surface substrate on which the convex portions or the concave portions are provided, and curing the chemical solution. Furthermore, the following content is also preferable.

"Further including: a segment smoothing step of applying a segment-smoothing chemical solution to the convex portions or the concave portions provided on a defocus surface substrate, curing the segment-smoothing chemical solution, and planarizing the convex portions by filling concave portions between the convex portions if the convex portions are provided, or planarizing the concave portions by filling the concave portions themselves if the concave portions are provided, thereby forming a segment smoothing layer; and a scratch resistant layer forming step of applying a scratch-resistant-layer chemical solution different from the segment-smoothing chemical solution to the segment smoothing layer, and curing the scratch-resistant-layer chemical solution, thereby forming a scratch resistant layer on the segment smoothing layer."

Figure 4:
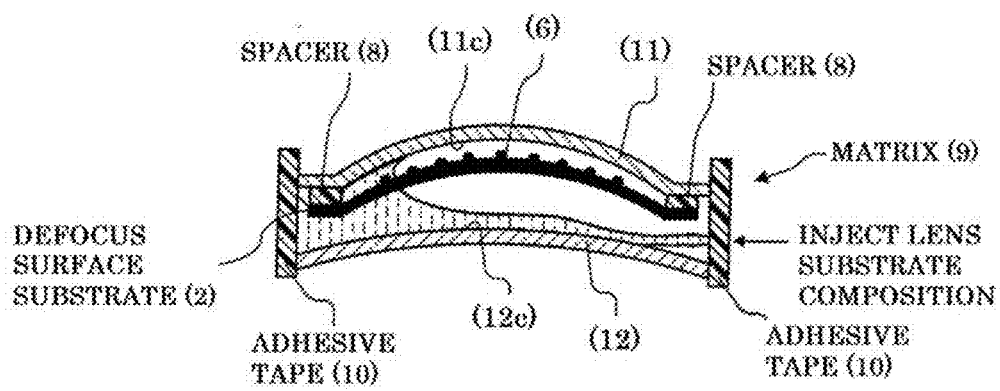
FIG. 4 is a cross-sectional view schematically showing a part of a method for manufacturing the spectacle lens according to Embodiment 2.

FIG. 4 is a cross-sectional view schematically showing a part of a method for manufacturing the spectacle lens according to Embodiment 2. Note that FIG. 4 is an improved version of FIG. 8 of JP 2013-160994 described in Embodiment 2.

In Embodiment 2, it is preferable to adopt the following aspect.

"Further including the steps of; bonding at least a part of a peripheral edge portion of a first lens-substrate mold on which an object-side surface or an eyeball-side surface is formed, to at least a part of a peripheral edge portion of a defocus surface substrate on which the convex portions or the concave portions are provided;
placing a second lens-substrate mold on which an eyeball-side surface or an object-side surface is formed, on a side opposite to the first lens-substrate mold, with the defocus surface substrate interposed between the second lens-substrate mold and the first lens-substrate mold; and
filling a raw material composition of a lens substrate between the first lens-substrate mold and the defocus surface substrate, and between the defocus surface substrate and the second lens-substrate mold, after bringing a first cavity between the first lens-substrate mold and the defocus surface substrate, and a second cavity between the second lens-substrate mold and the defocus surface substrate into communication, thereby sandwiching the interface portion between the defocus surface substrate on which the convex portions or the concave portions are provided, and a lens substrate provided on the defocus surface substrate."

The specific details of the steps are described in JP 2013-160994, and are therefore omitted in the present specification.

In order to smooth the portions of the outermost surface of the spectacle lens that correspond to the convex portions or the concave portions, the hard coating layer serving as the covering member in Embodiment 1 and the lens substrate serving as the covering member in Embodiment 2, for example, may be subjected to polishing or the like. This is not necessary if the above-described portions already have been smoothed.

OTHER EMBODIMENTS

Embodiment 3

FIG. 5 is a schematic cross-sectional view of a spectacle lens according to Embodiment 3.

In Embodiment 3, a case will be described where the interface portion does not itself constitute an interface in the form of a surface as in Embodiments 1 and 2, but is formed by an interface member in the form of a layer.

FIG. 5 shows a case where a pattern inverse to the pattern on the object-side surface is also formed on the eyeball-side surface of the defocus surface substrate of Embodiment 2. That is, as shown in FIG. 5, when convex portions are formed on the object-side surface side, concave portions are formed on the eyeball-side surface side, thus making the thickness of the defocus surface substrate substantially constant.

Then, a spectacle lens is produced using a gasket in the same manner as in Embodiment 2. However, in Embodiment 3, a first cavity and a second cavity are not in communication with each other, and raw material compositions having mutually different refractive indexes are injected into the cavities.

That is, in Embodiment 3, two types of members that sandwich the interface portion therebetween refer to a first in-cavity member formed so as to match the shape of a surface of the interface member that is located on the object-side surface side, and a second in-cavity member formed so as to match the shape of a surface of the interface member that is located on the eyeball-side surface side.

Also, the function of the second refractive region is exerted by using the refractive index of the first in-cavity member formed so as to match the shape of the surface of the interface member on the object-side surface side, the refractive index of the second in-cavity member formed so as to match the shape of the surface of the interface member on the eyeball-side surface side, and the shape of the convex portions or the concave portions. To be precise, the function of the second refractive region is exerted by using the difference in refractive index between the first in-cavity member and the interface member, the difference in refractive index between the second in-cavity member and the interface member, and the shape of the convex portions or the concave portions.

At this time, when the first in-cavity member is set as the defocus surface substrate, the second in-cavity member is the covering member, and vice versa. Taking into account that the interface member yields the shape of the convex portions or the concave portions in the first place, both of the two members may be set as the defocus surface substrates. That is, in Embodiment 3, "the covering member provided on the defocus surface substrate" means a covering member provided on the defocus surface substrate via the interface member.

The refractive index of the interface member is not particularly limited. The thickness of the interface member is also not particularly limited, and is 1 µm or less (preferably 0.1 µm or less), for example. The shape of the interface member is not particularly limited as long as convex portions or concave portions are provided on the surface of the interface member on the object-side surface side, a shape corresponding to the convex portions or the concave portions (i.e., a concave or convex shape, which are inverse shapes) is also provided on the surface of the interface member on the eyeball-side surface side, and the shapes of both surfaces of the interface member are ultimately transferred to a member in contact with both (of the) surfaces, thus contributing to the refractive error progression suppression effect of the spectacle lens.

For the purpose of achieving a myopia progression suppression effect, when convex portions are provided on the main surface located on the object-side surface as viewed from the interface member, the refractive index of the first in-cavity member is preferably smaller than the refractive index of the second in-cavity member. For the same purpose, when convex portions are provided on the main surface located on the eyeball-side surface side as viewed from the interface member, the refractive index of the first in-cavity member is preferably larger than the refractive index of the second in-cavity member.

Embodiment 4

In Embodiments 1 and 2, the spectacle lens is produced by bringing a fluid into contact with a main surface of a defocus surface substrate on which convex portions or concave portions have already been formed, and solidifying the fluid. On the other hand, this is not to exclude, for example, joining, to a main surface of a defocus surface substrate on which convex portions have already been formed, a main surface of another defocus surface substrate on which concave portions have also already been formed. However, minute convex portions and minute concave portions need to be accurately positioned relative to each other. In view of this, Embodiments 1 to 3 are more preferable.

[In the Case of Achieving Hyperopia Progression Suppression Effect]

In the spectacle lens and the method for manufacturing the same described thus far, by replacing the convex portions in the above-described content with concave portions, and the concave portions with convex portions, light beams are focused not on the front side, but on the back side, which is the opposite side, whereby a hyperopia progression suppression effect can be achieved.

An aspect that achieves a hyperopia progression suppression effect in the case of adopting Embodiment 1 is as follows.

"Concave portions are provided on the defocus surface substrate, and the refractive index of the defocus surface substrate is larger than the refractive index of the hard coating layer, or convex portions are provided on the defocus surface substrate, and the refractive index of the defocus surface substrate is smaller than the refractive index of the hard coating layer".

An aspect that achieves a hyperopia progression suppression effect in the case of adopting Embodiment 2 is as follows.

"Concave portions are provided on the defocus surface substrate, and the refractive index of the defocus surface substrate is larger than the refractive index of the lens substrate, or, convex portions are provided on the defocus surface substrate, and the refractive index of the defocus surface substrate is smaller than the refractive index of the lens substrate."

SUMMARY

In the following, a "spectacle lens and a method for manufacturing the same" according to the present disclosure will be summarized.

An embodiment of the present disclosure is as follows.

"A spectacle lens including:

an object-side surface and an eyeball-side surface;

a first refractive region having a first refractive power based on a prescription for correcting a refractive error of an eye; and a second refractive region having a refractive power different from the first refractive power, the second refractive region having a function of forming a focal point at a position other than a retina of the eye so as to suppress progression of the refractive error of the eye, wherein an interface portion is disposed inside the spectacle lens, the interface portion includes a base portion, and convex portions protruding from the base portion, or concave portions recessed from the base portion, the function of the second refractive region is exerted by using mutually different respective refractive indexes of two types of members sandwiching the interface portion therebetween, and the convex portions or the concave portions, and an outermost surface portion of the spectacle lens that corresponds to the convex portions or the concave portions is smooth."

LIST OF REFERENCE NUMERALS

1 Spectacle lens
2 Defocus surface substrate
3 Coating member
4s Interface
4m Interface member
5 Base portion
6 Convex portion
7 Lens substrate
8 Spacer
9 Matrix
10 Adhesive tape
11 First lens-substrate mold
11c First cavity
11m First in-cavity member
12 Second lens-substrate mold
12c Second cavity
12m Second in-cavity member
21 First refractive region
22 Second refractive region

The invention claimed is:

1. A spectacle lens comprising:
an object-side surface and an eyeball-side surface;
a first refractive region having a first refractive power based on a prescription for correcting a refractive error of an eye; and
a second refractive region having a refractive power different from the first refractive power, the second refractive region having a function of forming a focal point at a position other than a retina of the eye so as to suppress progression of the refractive error of the eye,
wherein an interface portion is disposed inside the spectacle lens,
the interface portion includes a base portion, and convex portions protruding from the base portion, or concave portions recessed from the base portion,
the function of the second refractive region is exerted by using mutually different respective refractive indexes of two types of members sandwiching the interface portion therebetween, and the convex portions or the concave portions, and
an outermost surface portion of the spectacle lens that corresponds to the convex portions or the concave portions is smooth,
wherein the interface portion is formed by a defocus surface substrate on which the convex portions or the concave portions are provided, and lens substrates provided so as to sandwich the defocus surface substrate therebetween,
wherein a film-shaped member embedded in the spectacle lens corresponds to the defocus surface substrate, and
wherein the convex portions or the concave portions are formed on the interface portion toward the object-side surface of the spectacle lens.

2. The spectacle lens according to claim 1,
wherein the two types of members sandwiching the interface portion therebetween are the defocus surface substrate on which the convex portions or the concave portions are provided, and a covering member provided on the defocus surface substrate.

3. The spectacle lens according to claim 1,
wherein the convex portions are provided on the defocus surface substrate, and a refractive index of the defocus surface substrate is larger than a refractive index of the lens substrates, or
the concave portions are provided on the defocus surface substrate, and a refractive index of the defocus surface substrate is smaller than a refractive index of the lens substrates.

4. The spectacle lens according to claim 1,
wherein a protruding height of the convex portions or a recessed depth of the concave portions is 4 µm or more.

5. The spectacle lens according to claim 1, wherein the interface portion includes convex portions protruding from the base portion.

6. The spectacle lens according to claim 1, wherein the interface portion includes concave portions recessed from the base portion.

7. A method for manufacturing a spectacle lens including:
an object-side surface and an eyeball-side surface;
a first refractive region having a first refractive power based on a prescription for correcting a refractive error of an eye; and
a second refractive region having a refractive power different from the first refractive power, the second refractive region having a function of forming a focal point at a position other than a retina of the eye so as to suppress progression of the refractive error of the eye, the method comprising:

placing an interface portion inside the spectacle lens, the interface portion including a base portion, and convex portions protruding from the base portion or concave portions recessed from the base portion;

causing the function of the second refractive region to be exerted by using mutually different respective refractive indexes of two types of members sandwiching the interface portion therebetween, and the convex portions or the concave portions; and smoothing an outermost surface portion of the spectacle lens that corresponds to the convex portions or the concave portions wherein the method further comprises the steps of:

bonding at least a part of a peripheral edge portion of a first lens-substrate mold on which an object-side surface or an eyeball-side surface is formed, to at least a part of a peripheral edge portion of a defocus surface substrate on which the convex portions or the concave portions are provided;

placing a second lens-substrate mold on which an eyeball-side surface or an object-side surface is formed, on a side opposite to the first lens-substrate mold, with the defocus surface substrate interposed between the second lens-substrate mold and the first lens-substrate mold; and filling a raw material composition of a lens substrate between the first lens-substrate mold and the defocus surface substrate, and between the defocus surface substrate and the second lens-substrate mold, after bringing a cavity between the first lens-substrate mold and the defocus surface substrate and a cavity between the second lens-substrate mold and the defocus surface substrate into communication, thereby sandwiching the interface portion between the defocus surface substrate on which the convex portions or the concave portions are provided, and a lens substrate provided on the defocus surface substrate.

8. A spectacle lens comprising:

an object-side surface and an eyeball-side surface;

a first refractive region having a first refractive power based on a prescription for correcting a refractive error of an eye; and a second refractive region having a refractive power different from the first refractive power, the second refractive region having a function of forming a focal point at a position other than a retina of the eye so as to suppress progression of the refractive error of the eye, wherein an interface portion is disposed inside the spectacle lens, the interface portion includes a base portion, and convex portions protruding from the base portion, or concave portions recessed from the base portion, the function of the second refractive region is exerted by using mutually different respective refractive indexes of two types of members sandwiching the interface portion therebetween, and the convex portions or the concave portions, and an outermost surface portion of the spectacle lens that corresponds to the convex portions or the concave portions is smooth, wherein the interface portion is formed by an interface member in the form of a layer, wherein the interface member includes the base portion, and the convex portions protruding from the base portion, or the concave portions recessed from the base portion, wherein a pattern inverse to a pattern on an object-side surface of the interface member is formed on an eyeball-side surface of the interface member, wherein the pattern on the object-side surface comprises the convex portions protruding from the base portion, or the concave portions recessed from the base portion, and wherein a thickness of the interface member is thus made substantially constant, wherein the two types of members sandwiching the interface portion therebetween refer to a first in-cavity member and a second in-cavity member, wherein the first in-cavity member is formed so as to match a shape of a surface of the interface member that is located on the object-side surface side, wherein the second in-cavity member is formed so as to match the shape of a surface of the interface member that is located on the eyeball-side surface side, wherein the first in-cavity member and the second in-cavity member have mutually different refractive indexes, wherein the function of the second refractive region is exerted by using the difference in refractive index between the first in-cavity member and the interface member, the difference in refractive index between the second in-cavity member and the interface member, and the shape of the convex portions or the concave portions.

9. The spectacle lens according to claim 8, wherein the convex portions are provided on the object-side surface as viewed from the interface member, and a refractive index of the first in-cavity member is smaller than a refractive index of the second in-cavity member, or wherein the convex portions are provided on the eyeball-side surface as viewed from the interface member, and a refractive index of the first in-cavity member is larger than a refractive index of the second in-cavity member.

10. The spectacle lens according to claim 8, wherein the convex portions are provided on the object-side surface of the interface member.

11. The spectacle lens according to claim 8, wherein the concave portions are provided on the object-side surface of the interface member.

12. A method for manufacturing a spectacle lens including:

an object-side surface and an eyeball-side surface;

a first refractive region having a first refractive power based on a prescription for correcting a refractive error of an eye; and a second refractive region having a refractive power different from the first refractive power, the second refractive region having a function of forming a focal point at a position other than a retina of the eye so as to suppress progression of the refractive error of the eye, the method comprising:

placing an interface portion inside the spectacle lens, the interface portion including a base portion, and convex portions protruding from the base portion or concave portions recessed from the base portion;

causing the function of the second refractive region to be exerted by using mutually different respective refractive indexes of two types of members sandwiching the interface portion therebetween, and the convex portions or the concave portions; and smoothing an outermost surface portion of the spectacle lens that corresponds to the convex portions or the concave portions, the interface portion being formed by an interface member in the form of a layer, the interface member including the base portion, and the convex portions protruding from the base portion, or the concave portions recessed from the base portion, wherein a pattern inverse to a pattern on an object-side surface of the interface member is formed on an eyeball-side surface of the interface member, the pattern on the object-side surface comprising the convex portions protruding from the base portion, or the concave portions recessed from the base portion, and wherein a thickness of the interface member is thus made substantially constant, wherein the method further comprises the steps of:

bonding at least a part of a peripheral edge portion of a first mold on which the object-side surface is formed, to at least a part of a peripheral edge portion of the interface member, thereby forming a first cavity;

placing a second mold on which the eyeball-side surface is formed, on a side opposite to the first mold, with the interface member interposed between the second mold and the first mold, thereby forming a second cavity, the first cavity and the second cavity being not in communication with each other; and injecting a first raw material composition of a first in-cavity member into the first cavity and forming the first in-cavity member so as to match the shape of a surface of the interface member that is located on the object-side surface side, and injecting a second raw material composition of a second in-cavity member into the second cavity and forming the second in-cavity member so as to match the shape of a surface of the interface member that is located on the eyeball-side surface side, the first raw material composition and the second raw material composition having mutually different refractive indexes, thereby sandwiching the interface portion between the first in-cavity member and the second in-cavity member, wherein the method further comprises: causing the function of the second refractive region to be exerted by using the difference in refractive index between the first in-cavity member and the interface member, the difference in refractive index between the second in-cavity member and the interface member, and the shape of the convex portions or the concave portions.

* * * * *